United States Patent
Osofsky

[11] 3,883,096
[45] May 13, 1975

[54] TRANSPIRATION COOLED NOSE CONE

[75] Inventor: Irving B. Osofsky, Rancho Plaos Verdes, Calif.

[73] Assignee: The United States of America as represented by the Secretary of the Army, Washington, D.C.

[22] Filed: Mar. 12, 1974

[21] Appl. No.: 450,537

[52] U.S. Cl. ............... 244/117 A; 62/239; 102/105; 244/163
[51] Int. Cl. ............................................ B64c 1/38
[58] Field of Search ........ 244/117 A, 163; 102/105; 62/239, 315, 467, DIG. 5

[56] References Cited
UNITED STATES PATENTS

| | | | |
|---|---|---|---|
| 3,014,353 | 12/1961 | Scully et al. | 244/117 A X |
| 3,026,806 | 3/1962 | Runton et al. | 102/105 |
| 3,159,012 | 12/1964 | Brunner | 244/117 A |
| 3,267,857 | 8/1966 | Lindberg | 102/105 |
| 3,318,246 | 5/1967 | Wilhelm et al. | 102/105 |
| 3,596,604 | 8/1971 | Corkery | 244/117 A |
| 3,793,861 | 2/1974 | Burkhard et al. | 244/117 A X |

*Primary Examiner*—Trygve M. Blix
*Assistant Examiner*—Barry L. Kelmachter
*Attorney, Agent, or Firm*—Joseph H. Beumer; Joseph H. Beumer; James T. Deaton

[57] ABSTRACT

A nose cone that is cooled by having a metal, a salt, or other filler impregnated in the pores of the material from which the nose cone proper is made and a chamber that is filled with a solid mass of the same metal or filler that is used for cooling the nose cone. The metal or filler filling the pores and the chamber cools the nose cone by boiling, vaporizing and escaping at the surface of the nose cone.

6 Claims, 1 Drawing Figure

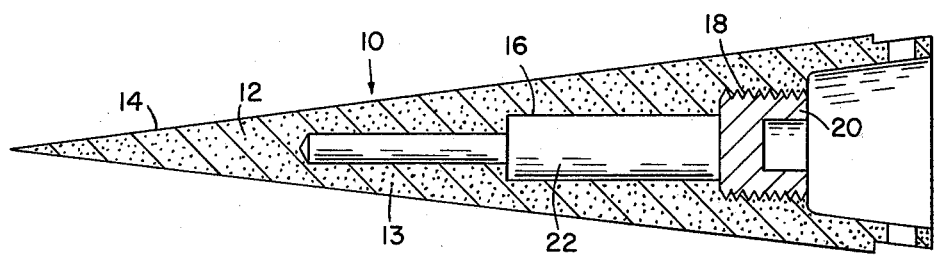

TRANSPIRATION COOLED NOSE CONE

BACKGROUND OF THE INVENTION

Nose cones or tips on hypersonic missiles are subject to high thermal stress, oxidation, high bending stress and high aerodynamic loading. Erosion due to oxidation results in center of gravity shift of the missile which affects the control system of the missile. Also, the nose cone on hardpoint and urban advanced interceptors has difficulty in surviving aerodynamic heating and erosion for flight times which are longer than those presently encountered.

Therefore, it is an object of this invention to provide a nose cone that can withstand long flight times at very high speed without ablating away or eroding away having the surface of the nose cone cooled with a metallic or other material impregnated in the nose cone.

Another object of this invention is to provide a nose cone that has a hollow chamber portion that is filled with metal or other material for cooling the nose cone.

Another object of this invention is to provide a nose cone that can have a hollow portion, a sharp nose and a nose cone that can be maintained at substantially the boiling point of the metal or filler impregnating the material of the nose cone.

SUMMARY OF THE INVENTION

In accordance with this invention, a nose cone is provided in which the nose cone is made of porous sintered tungsten impregnated with a metal such as lead, magnesium, aluminum, copper, and silver and/or salts of the metals or other coolants such as plastics. The nose cone also has a hollow portion that is filled with the same metal or material that fills the pores of the sintered tungsten. A plug closes the hollow portion and seals the metal or material within the nose cone.

BRIEF DESCRIPTION OF THE DRAWINGS

In the drawings:

The single FIG. is a sectional view in accordance with this invention.

DESCRIPTION OF THE PREFERRED EMBODIMENT

Referring to the drawing, nose cone 10 has a body member 12 with an inner bore 16 and an outer cone shaped surface 14 that is tapered to a sharp point. Bore 16 has one end threaded at 18 to receive threaded plug 20, and solid coolant metallic or other material 22 fills bore 16. Body member 12 is made of a tungsten alloy such as porous sintered tungsten impregnated or infiltered with a solid metallic or other coolant 13 in the pores of member 12. Solid metallic coolant 13 and solid coolant metallic material 22 are preferrably silver or copper, but may be selected from other metals such as lead, magnesium, and aluminum and/or salts of the metals or other coolants such as plastics. In some applications, it may be advantageous to have the wall thickness of the nose cone substantially constant to minimum transient temperature discontinuities.

In operation, when impregnated or infiltered tungsten alloy body member 12 is heated to the boiling point of the metal or other coolant contained therein, the temperature ceases to rise because the added heat serves to boil off more metal or other coolant at constant temperature. The high coolant vapor pressure acts as a pump and diffuses the metal or other coolant to the surface as required to areas of high heat flux. As can be seen, the nose cone will be less subject to thermal shock and erosion due to its being cooled. Also, "boiling metal" transpiration cooling will maintain the nose cone temperature at a safe level and a substantially uniform temperature will exist in the cross section to minimize thermal stress. Contours of the nose cone will not be eroded significantly as long as "metal coolant" is available.

I claim:

1. A missile nose cone comprising a cone shaped body member that has an outer surface that is tapered to a point, said cone shaped member being made of tungsten alloy impregnated with solid coolant is embedded and contained within pores of said tungsten alloy so that said solid coolant material of said boiling coolant material.

2. A missile nose cone as set forth in claim 1, wherein said tungsten alloy is porous sintered tungsten, said solid coolant material is selected from the group consisting of silver and copper, and wherein said body member has an inner bore therein that is filled with said solid coolant material.

3. A missile nose cone as set forth in claim 2, wherein a threaded plug is received in a threaded end of said inner bore to close said inner bore and seal in said solid coolant material.

4. A missiel nose cone as set forth in claim 2, wherein said solid coolant material is silver.

5. A missile nose cone as set forth in claim 2, wherein said solid coolant material is copper.

6. A missile nose cone as set forth in claim 2, wherein said solid coolant material is selected from metal salts.

* * * * *

UNITED STATES PATENT OFFICE
CERTIFICATE OF CORRECTION

PATENT NO. : 3,883,096
DATED : May 13, 1975
INVENTOR(S) : Irving B. Osofsky

It is certified that error appears in the above-identified patent and that said Letters Patent are hereby corrected as shown below:

On the cover sheet, the inventor information should read
--[75] Inventor: Irving B. Osofsky, Rancho Palos Verdes, Calif.--.

Column 2, lines 27-33, claim 1 should read
--1. A missile nose cone comprising a cone shaped body member that has an outer surface that is tapered to a point, said cone shaped member being made of tungsten alloy impregnated with solid coolant material that is embedded and contained within pores of said tungsten alloy so that said solid coolant material will boil off at said surface when heated to the boiling point of said solid coolant material and thereby maintain the temperature of said body member at a safe level and a substantially uniform temperature of said boiling coolant material.--.

Column 2, line 44, in claim 4 "missiel" should read --missile--.

Signed and Sealed this seventh Day of October 1975

[SEAL]

Attest:

RUTH C. MASON
Attesting Officer

C. MARSHALL DANN
Commissioner of Patents and Trademarks